United States Patent
Hwang et al.

(10) Patent No.: US 7,397,866 B2
(45) Date of Patent: Jul. 8, 2008

(54) APPARATUS AND METHOD FOR TRANSMITTING/RECEIVING DIFFERENTIAL STBC USING CHANNEL POWER

(75) Inventors: Chan-Soo Hwang, Yongin-si (KR); Seung-Hoon Nam, Seoul (KR); Jae-Hak Chung, Seoul (KR); Yung-Soo Kim, Pundang-gu (KR)

(73) Assignee: Samsung Electronics Co., Ltd (KR)

( * ) Notice: Subject to any disclaimer, the term of this patent is extended or adjusted under 35 U.S.C. 154(b) by 786 days.

(21) Appl. No.: 10/771,494

(22) Filed: Feb. 4, 2004

(65) Prior Publication Data
US 2004/0213353 A1 Oct. 28, 2004

(30) Foreign Application Priority Data
Apr. 25, 2003 (KR) ............... 10-2003-0026265

(51) Int. Cl.
*H03K 9/00* (2006.01)
(52) U.S. Cl. .................................. 375/316
(58) Field of Classification Search ........... 375/316, 375/324, 349, 130, 147; 370/207
See application file for complete search history.

(56) References Cited

U.S. PATENT DOCUMENTS 5,953,365 A * 9/1999 Badke .................. 375/316
6,771,590 B1 * 8/2004 Marchok et al. ........... 370/207

FOREIGN PATENT DOCUMENTS

WO WO 02/052773 7/2002

OTHER PUBLICATIONS

Tao et al., "Differential Space-Time Block Codes", 2001 IEEE, pp. 1098-1102.
Diggavi et al., "Differential Space-Time Coding for Frequency-Selective Channels", 2002 IEEE, pp. 253-255.
Tarokh et al., "Space-Time Block Codes from Orthogonal Designs", IEEE Transactions on Information Theory, vol. 45, No. 5, Jul. 1999, pp. 1456-1467.
Jafarkhani et al., "Multiple Transmit Antenna Differential Detection From Generalized Orthogonal Designs", IEEE Transactions on Information Theory, vol. 47, No. 6, Sep. 2001, pp. 2626-2631.

* cited by examiner

*Primary Examiner*—Khai Tran
(74) *Attorney, Agent, or Firm*—The Farrell Law Firm, PC

(57) ABSTRACT

A method and apparatus for transmitting/receiving a differential space-time block code (STBC) by estimating only channel power in a wireless communication system using a plurality of transmission antennas. A receiver for receiving information symbols encoded by a differential STBC before and decoding the received information symbols collects a signal received at a reception antenna from a plurality of transmission antennas for one block duration; calculates a substitution signal by multiplying the received signal by a signal received for a previous block duration; estimates channel power for a channel from the plurality of transmission antennas to the reception antenna; normalizes the estimated channel power with a normalization value determined as a size of previously received symbols; and calculates information symbols by dividing the substitution signal by the normalized channel power.

16 Claims, 8 Drawing Sheets

APPARATUS AND METHOD FOR TRANSMITTING/RECEIVING DIFFERENTIAL STBC USING CHANNEL POWER

PRIORITY

This application claims priority under 35 U.S.C. § 119 to an application entitled "Apparatus and Method for Transmitting/Receiving Differential STBC Using Channel Power" filed in the Korean Intellectual Property Office on Apr. 25, 2003 and assigned Serial No. 2003-26265, the contents of which are incorporated herein by reference.

BACKGROUND OF THE INVENTION

1. Field of the Invention

The present invention relates generally to a wireless communication system, and in particular, to a transmission/reception apparatus and method using transmit antenna diversity to cope with signal degradation caused by fading.

2. Description of the Related Art

Transmit diversity is one of the many effective technologies designed for relieving fading in a wireless communication system. Typical transmit diversity technology detects desired data symbols using a channel characteristic from a transmitter to a receiver. However, because of the mobility and variation of a channel, it is impossible to correctly detect a channel characteristic between a transmitter and a receiver. Further, feeding back channel state information to the transmitter undesirably results in a reduction in the channel capacity. Therefore, a large amount of research has been conducted on transmit diversity for the case where a transmitter has no channel information.

Recently, space-time block coding (STBC) has attracted a great deal of public attention because it provides good performance when a high data rate is required. In particular, Tarokh et al. proposes a space-block trellis code capable of obtaining both good coding gains and diversity gains when a plurality of antennas are used (see Vahid Tarokh, Et al. "Space time block coding from orthogonal design," IEEE Trans. on Info. Theory, Vol. 45, pp. 1456-1467, July 1999). Here, the diversity gain corresponds to a reduction in channel gain generated by a fading channel.

FIG. 1 is a block diagram illustrating a conventional transmitter using a space-time block code (STBC). As illustrated in FIG. 1, the transmitter includes a serial-to-parallel (S/P) converter 10, an encoder 20, and N transmission antennas 30-1, 30-2, . . . , 30-N.

Referring to FIG. 1, the S/P converter 10 creates a block of symbols by grouping symbols received from a predetermined information source (not shown) by the N symbols, and provides the created symbol block to the encoder 20. The encoder 20 creates a predetermined number of combinations with the N symbols, and delivers the combinations via the N transmission antennas 30-1, 30-2, . . . , 30-N for their corresponding time periods. The time periods indicate symbol durations.

When 4 transmission antennas are used, symbols output from the encoder 20 can be expressed by a 4*4 encoding matrix shown in Equation (1) below.

$$g_{44} = \begin{pmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \end{pmatrix} \quad (1)$$

In Equation (1), $s_1$, $s_2$, $s_3$, and $s_4$ are data symbols to be transmitted. Symbols in each column are transmitted for respective time periods, and symbols in each row are transmitted via the respective antennas. Because symbols of one block are transmitted for 4 time periods, the 4 time periods are referred to as "one block duration." Respective columns of the encoding matrix are orthogonal with one another, and this simplifies coding, helps to decoding and obtains maximum diversity gain.

FIG. 2 is a block diagram illustrating a conventional receiver for receiving the signal transmitted from the transmitter illustrated in FIG. 1. As illustrated in FIG. 2, the receiver includes M reception antennas 40-1, 40-2, . . . , 40-M, a channel estimator 50, a multi-channel symbol arranger 60, and a detector 70.

Referring to FIG. 2, the channel estimator 50 estimates channel coefficients indicating channel gains from the transmission antennas 30-1 to 30-N to the reception antennas 40-1 to 40-M, and the multi-channel symbol arranger 60 collects symbols received by the reception antennas 40-1 to 40-M and provides the collected symbols to the detector 70. The detector 70 detects desired symbols by maximum likelihood (ML) decoding, using hypothesis symbols calculated by multiplying the received signals by the channel coefficients.

In the receiver, a received signal x is expressed by Equation (2) below.

$$r_i = \sum_i h_i s_{t,i} + w_t \quad (2)$$

In Equation (2), t is a symbol duration index (t=0,1, . . . ), and $h_i$ indicates channel gain from an $i^{th}$ transmission antenna to the receiver, and is assumed to be an independent complex Gaussian random variable having a variance of 0.5 per real dimension under flat fading. In addition, $s_{t,i}$ indicates a symbol output via an $i^{th}$ transmission antenna for a $t^{th}$ symbol duration, and $w_t$ is a noise at a $t^{th}$ symbol duration and has an independent zero mean complex Gaussian characteristic having a variance of 1/SNR (Signal-to-Noise Ratio) per complex dimension.

When symbols used during transmission/reception are PSK (Phase Shift Keying) symbols, the symbols are located in a unit circle of a constellation. This means that the symbols are all identical in amplitude. Then, ML decoding of transmitted symbols is equivalent to finding symbols nearest to a linear combination of a received signal r and a channel gain h among all possible symbols.

To decode STBC, information on channel gains is required. When channel characteristic vary fast, it is very difficult to estimate correct information on channel gain, and when a channel characteristic is incorrectly measured, performance of STBC is considerably deteriorated. In order to enable a receiver to effectively estimate a channel characteristic, a transmitter must transmit a training sequence, and the transmission of a training sequence reduces transmission efficiency.

In order to resolve the above-mentioned problem, differential STBC has been developed for which information on a channel characteristic is not required (see H. Jafarkhani, Vahid Tarokh, "Multiple Transmit antenna differential Detection from generalized orthogonal designs," IEEE Trans. on Info. Theory, Vol. 47, pp. 2626-2631, September 2001).

FIG. 3 is a block diagram illustrating a conventional transmitter using a differential space-time block code (STBC). As illustrated in FIG. 3, the transmitter includes a serial-to-parallel (S/P) converter 105, multipliers 110-1, ..., 110-K, an adder 115, a delay 120, an encoder 125, and K transmission antennas 130-1, 130-2, ..., 130-K.

Referring to FIG. 3, the S/P converter 105 parallel-converts a previously transmitted symbol block $S_v$ delayed by the delay 120, and outputs K previous symbols $S_{v,1}, \ldots, S_{v,K}$. The multipliers 110-1 to 110-K multiply the K previous symbols by information symbols $P_{v+1,1}, \ldots, P_{v+1,K}$ to be actually transmitted, respectively, and the adder 115 adds output symbols of the multipliers 110-1 to 110-K, and delivers the result to the delay 120, thereby enabling the result to be multiplied by the next information symbols. Further, the adder 115 provides the added result to the encoder 125. The encoder 125 creates a predetermined number of combinations with output symbols of the multipliers 110-1 to 110-K, and transmits the combinations via the transmission antennas 130-1, 130-2, ..., 130-K for the corresponding time periods.

An operation of the transmitter will be described with reference to an example where K=4. Initially, the transmitter transmits a particular symbol block $S_1 = [s_{1,1} \sim s_{1,4}]$ having no information according to the encoding matrix. Thereafter, the transmitter transmits $S_v = [S_{v,1} \sim S_{v,4}]$ in the same manner according to the encoding matrix. When information symbols $P_{v+1} = (P_{v+1,1} \cdots P_{v+1,4})$ to be transmitted at a time v+1 are received, a transmission symbol $S_{v+1}$ is determined by Equation (3) below.

$$S_{v+1} = \sum_{k=1}^{4} P_{v+1,k} V_k(S_v) \quad (3)$$

That is, information symbols to be transmitted at a time v+1 are multiplied by respective symbols of a symbol block $V_k(S_v)$ transmitted at a previous time v, and then added before being transmitted. Here, the information symbols are a real number created by BPSK (Binary Phase Shift Keying). For the symbol block $V_k(S_v)$, symbol combinations output from the encoder 125 for 4 symbol durations are given by Equation (4), $$V_1(S_v) = (s_{v,1}, s_{v,2}, s_{v,3}, s_{v,4})^T$$

$$V_2(S_v) = (s_{v,2}, -s_{v,1}, s_{v,4}, -s_{v,3})^T$$

$$V_3(S_v) = (s_{v,3}, -s_{v,4}, -s_{v,1}, s_{v,2})^T$$

$$V_4(S_v) = (s_{v,4}, s_{v,3}, -s_{v,2}, -s_{v,1})^T \quad (4)$$

where T indicates a transposed matrix.

FIG. 4 is a block diagram illustrating a conventional receiver for receiving a signal transmitted from the transmitter illustrated in FIG. 3. As illustrated in FIG. 4, the receiver includes M reception antennas 150-1, 150-2, ..., 150-M, K delays 155-1, ..., 155-K, K multipliers 160-1, ..., 160-K, a symbol arranger 165, and a detector 170.

Referring to FIG. 4, the delays 155-1 to 155-K delay signals previously received for one block duration, and output the delayed signals to the multipliers 160-1 to 160-K. The symbol arranger 165 provides the multipliers 160-1 to 160-K with signals received at the reception antennas 150-1 to 150-M from the transmission antennas 130-1 to 130-K for one block duration. The multipliers 160-1 to 160-K calculate substitution signals by multiplying the receive signals by the previously received signals, and provide the calculated substitution signals to the detector 170. The detector 170 detects an information sequence with the substitution signals according to a corresponding modulation scheme.

In order to describe an operation of the receiver, if the received signal shown in Equation (1) is extended for plural block durations, then $$r_{v,t} = h_1 s_{v,t,1} + h_2 s_{v,t,2} + h_3 s_{v,t,3} + h_4 s_{v,t,4} + w_{v,t} \quad (5).$$

In Equation (5), t is a symbol duration index, and v is a block duration index. In the case of STBC using 4 transmission antennas, one block duration is comprised of 4 symbol durations. In addition, $w_{v,t}$ is a noise at a $t^{th}$ symbol duration in a $v^{th}$ block duration. When 4 transmission antennas and the encoding matrix of Equation (1) are used, Equation (5) can be rewritten as $$r_{v,1} = h_1 s_{v,1} + h_2 s_{v,2} + h_3 s_{v,3} + h_4 s_{v,4} + w_{v,1}$$

$$r_{v,2} = -h_1 s_{v,2} + h_2 s_{v,1} - h_3 s_{v,4} + h_4 s_{v,3} + w_{v,2}$$

$$r_{v,3} = -h_1 s_{v,3} + h_2 s_{v,4} + h_3 s_{v,1} - h_4 s_{v,2} + w_{v,3}$$

$$r_{v,4} = -h_1 s_{v,4} - h_2 s_{v,3} + h_3 s_{v,2} + h_4 s_{v,1} + w_{v,4} \quad (6).$$

By arranging Equation (6), reception signal combinations are created as follows in Equation (7).

$$R_v^1 = (r_{v,1}, r_{v,2}, r_{v,3}, r_{v,4}) = (s_{v,1}, s_{v,2}, s_{v,3}, s_{v,4}) H_\perp + (w_{v,1}, w_{v,2}, w_{v,3}, w_{v,4})$$

$$R_v^2 = (r_{v,2}, r_{v,1}, r_{v,4}, -r_{v,3}) = (s_{v,2}, -s_{v,1}, s_{v,4}, -s_{v,3}) H_\perp + (-w_{v,2}, w_{v,1}, w_{v,4}, -w_{v,3})$$

$$R_v^3 = (-r_{v,3}, -r_{v,4}, r_{v,1}, r_{v,2}) = (s_{v,3}, -s_{v,4}, -s_{v,1}, s_{v,2}) H_\perp + (-w_{v,3}, -w_{v,4}, w_{v,1}, w_{v,2})$$

$$R_v^4 = (-r_{v,4}, r_{v,3}, -r_{v,2}, r_{v,1}) = (s_{v,4}, s_{v,3}, -s_{v,2}, -s_{v,1}) H_\perp + (-w_{v,4}, w_{v,3}, -w_{v,2}, w_{v,1}) \quad (7)$$

The reception signal combination $R_v^i$ is used to detect an $i^{th}$ information symbol. Here, $H_\perp$ indicates channel characteristics in a matrix form, and is defined by Equation (8) as follows.

$$H_\perp = \begin{bmatrix} h_1 & h_2 & h_3 & h_4 \\ h_2 & -h_1 & -h_4 & h_3 \\ h_3 & h_4 & -h_1 & -h_2 \\ h_4 & -h_3 & h_2 & -h_1 \end{bmatrix} \quad (8)$$

A product of a reception signal at a time v and a reception signal at a time v+1, i.e., a substitution signal, is determined by Equation (9).

$$R\{R_{v+1}^n R_v^{nH}\} = R\{S_{v+1}^T H_\perp H_\perp^H (V_n(S_v)^T)^H + W_n\} \quad (9)$$

$$= \sum_i^4 |h_i|^2 P_{v+1,n} + R\{W_n\}$$

In Equation (9), $R\{\cdot\}$ means real conversion, and $(\cdot)^H$ indicates Hermitian transpose. Equation (9) represents a substitution signal for calculating an $n^{th}$ information symbol $P_{v+1,n}$.

According to Equation (9), all elements except the information symbols $P_{v+1,1}$ to $P_{v+1,4}$ are real numbers, and the noise information is already known. On a 4-dimention hyper sphere having each of the information symbols as one axis, if a distance from the origin of the information symbols is identical, a receiver can detect information symbol $P_{v+1,1}$ to $P_{v+1,4}$ even though a value of h indicating a channel characteristic is unknown.

In the conventional transmission/reception system described above, decoding can be performed even though a channel characteristic is unknown. However, symbols in use must be real symbols having the same size. Therefore, in differential STBC technology, transmission symbols are restricted to BPSK symbols. BPSK symbols carry 1-bit information per second per bandwidth (1 bit/hz/sec). However, it is possible to transmit PSK modulation data by grouping transmission symbols by a predetermined number of symbols. For example, it is possible to group 4 symbols by the 2 symbols and then carry 16PSK modulation data on each symbol group. When 2 symbols transmit 16PSK modulation data in this manner, two 16PSK symbols are transmitted for 4 time periods. As a result, it is possible to carry 2-bit information per second per bandwidth (2 bits/hz/sec).

As is well known, M-ary QAM (Quadrature Amplitude Modulation) is more effective than M-ary PSK in view of a signal-to-noise ratio (SNR). In the conventional differential STBC system, PSK must be used even when information of 2 bits or more is carried. Therefore, it is not possible to secure performance improvement attributable to the use of QAM. For example, when 64PSK is used instead of 64QAM, a decrease in SNR accounts to 9.95 dB, and this has a fatal effect on the wireless communication system.

SUMMARY OF THE INVENTION

It is, therefore, an object of the present invention to provide a method for decoding a differential space-time block code (STBC) using channel power in a transmit antenna diversity system.

It is another object of the present invention to provide a decoding method being less susceptible to variation and estimation in accuracy of a channel, and having a low SNR loss in a transmit antenna diversity system.

According to one aspect of the present invention, the invention provides a method for encoding information symbols by a differential space-time block code (STBC) and transmitting the encoded information symbols via a plurality of transmission antennas for transmit diversity in a wireless communication system. The method comprises the steps of: receiving one block of information symbols, generating normalized symbols by multiplying the information symbols by one block of previously transmitted transmission symbols and then dividing the multiplication result by a normalization value, which is determined as a size of the previously transmitted transmission symbols; forming the normalized symbols into a plurality of combinations to transmit the normalized symbols once at each antenna for each time period; and transmitting the combinations via the transmission antennas for a plurality of corresponding symbol durations.

According to another aspect of the present invention, the invention provides a method for receiving information symbols encoded by a differential space-time block code (STBC) before being transmitted and decoding the received information symbols in a wireless communication system. The method comprises the steps of collecting a signal received at a reception antenna from a plurality of transmission antennas for one block duration; calculating a substitution signal by multiplying the received signal by a signal received for a previous block duration; estimating channel power for a channel from the plurality of transmission antennas to the reception antenna; normalizing the estimated channel power with a normalization value determined as a size of previously received symbols; and calculating information symbols by dividing the substitution signal by the normalized channel power.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness. The terms used herein are defined in consideration of their functions in the invention, and can be changed according to a user's intentions, and usual practices. Therefore, the definition should be made based on the overall contents of the specification.

The present invention provides a method for decoding a partially coherent space-time block code, which does not require a training sequence, is robust to channel variation, and has a low SNR loss by using only estimated power of a channel in decoding a differential space-time block code (STBC) in a transmit diversity system. The invention can transmit symbols having different distances from the origin on a multidimension hyper sphere.

Figure 1:
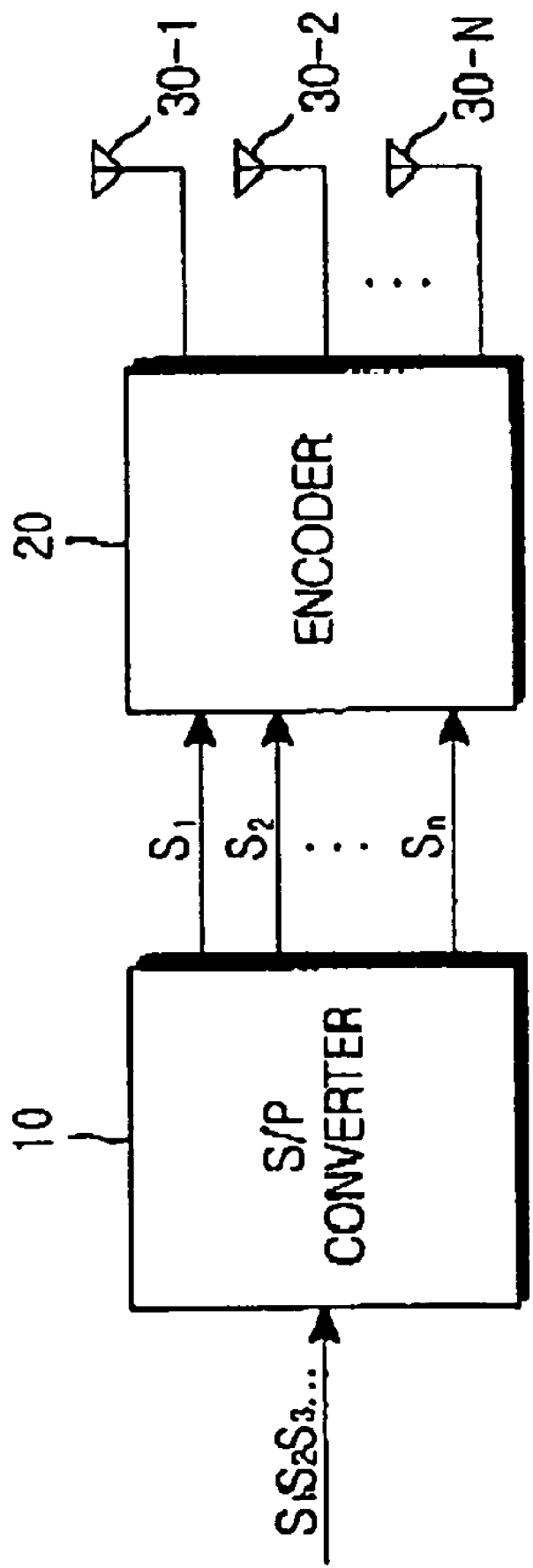
FIG. 1 is a block diagram illustrating a conventional transmitter using a space-time block code.
Figure 2:
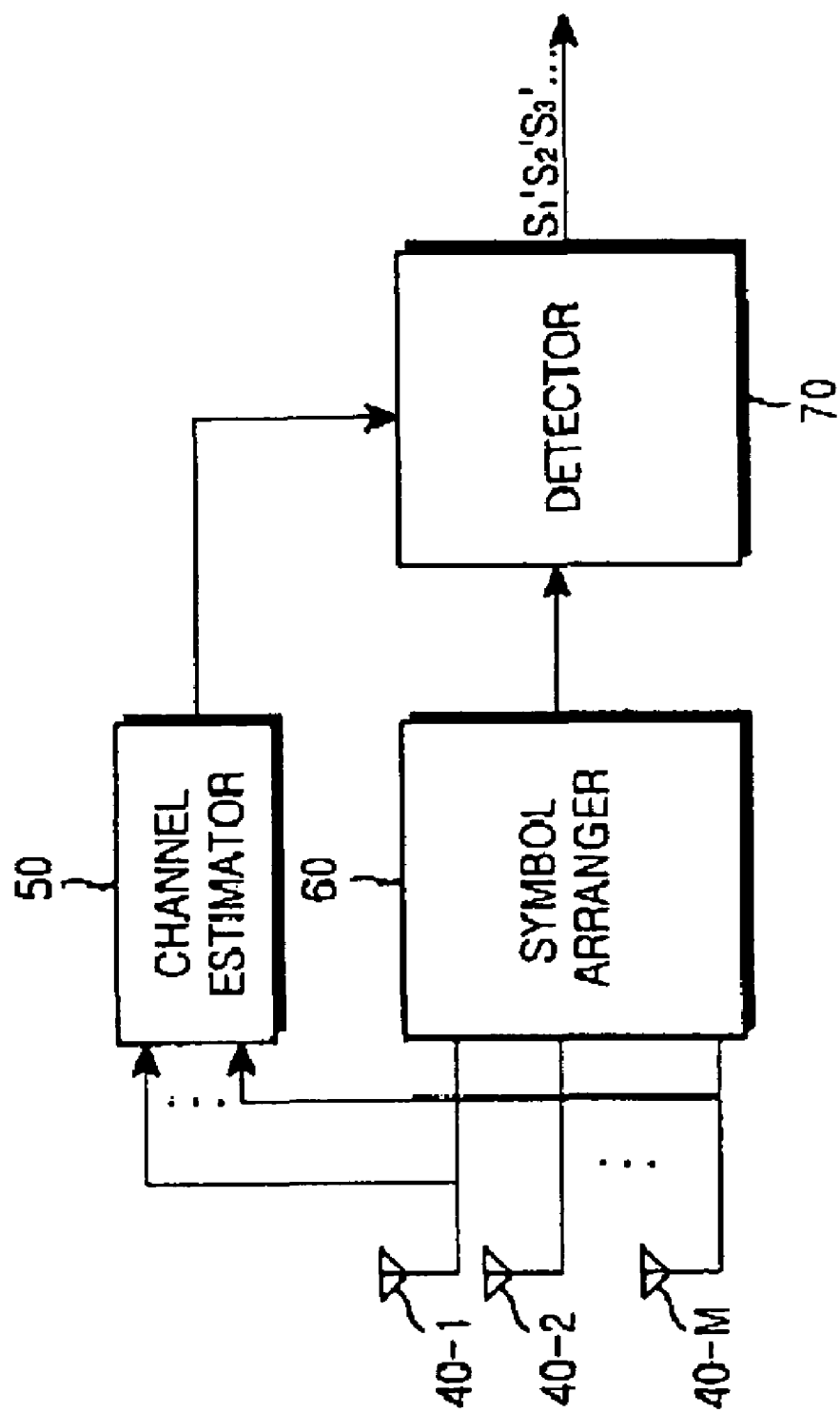
FIG. 2 is a block diagram illustrating a conventional receiver for receiving a signal transmitted from the transmitter illustrated in FIG. 1.
Figure 3:
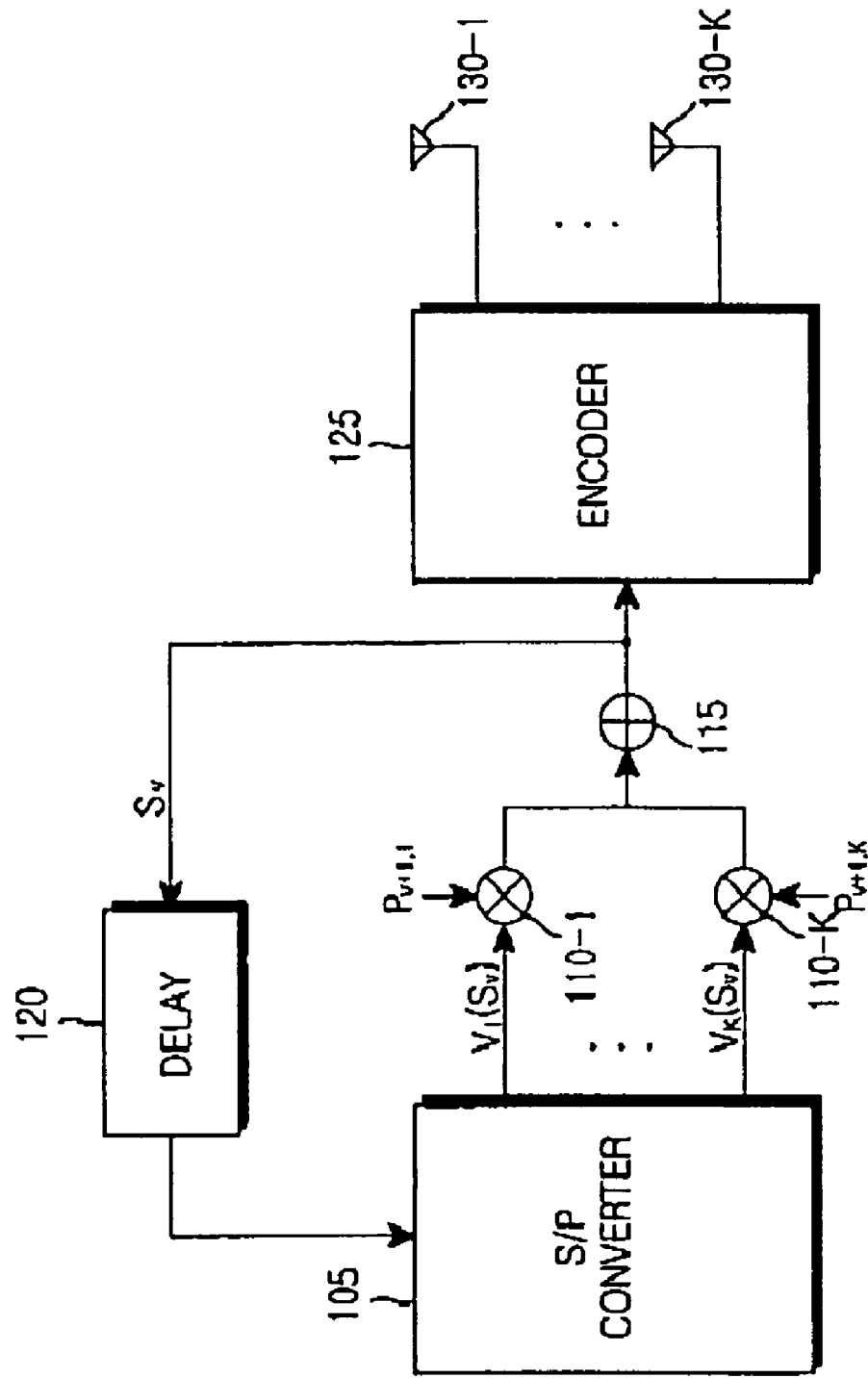
FIG. 3 is a block diagram illustrating a conventional transmitter using a differential space-time block code.
Figure 4:
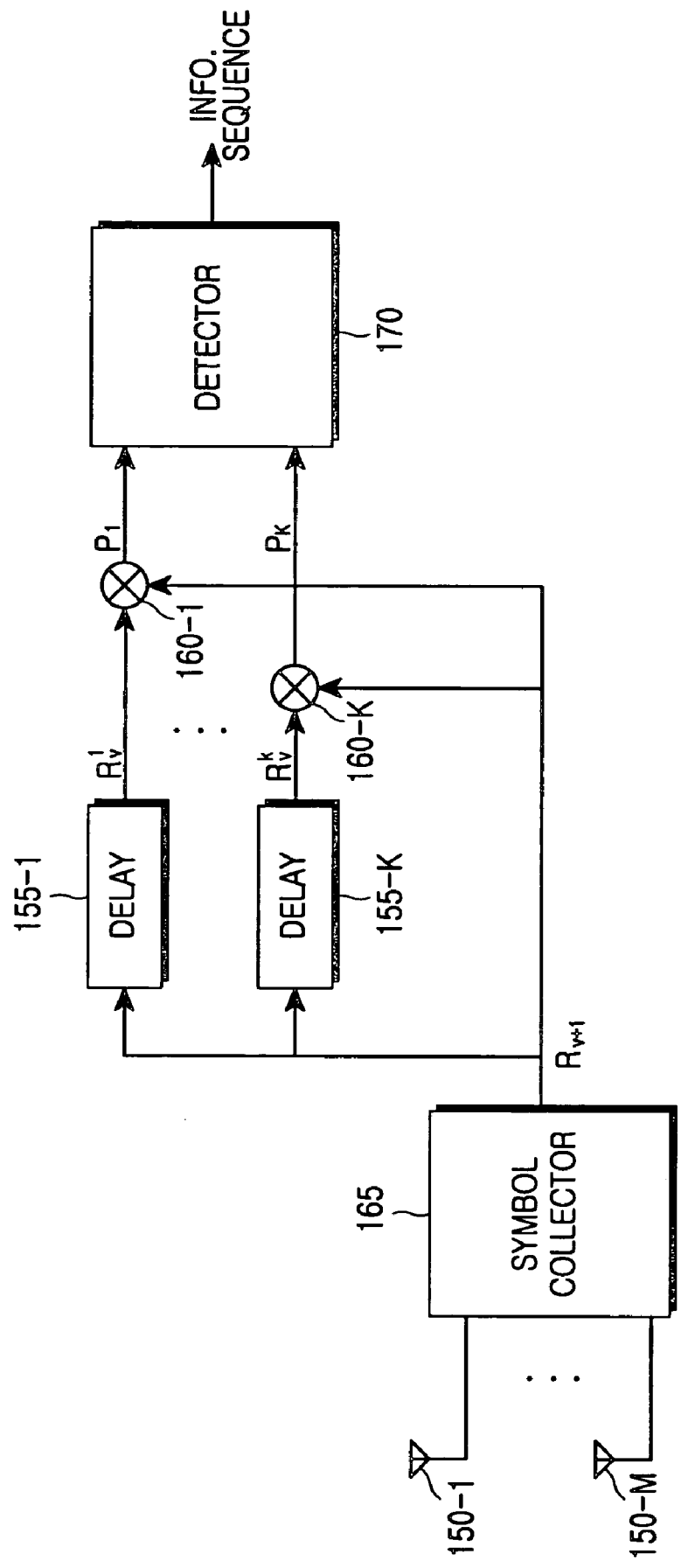
FIG. 4 is a block diagram illustrating a conventional receiver for receiving a signal transmitted from the transmitter illustrated in FIG. 3.
Figure 5:
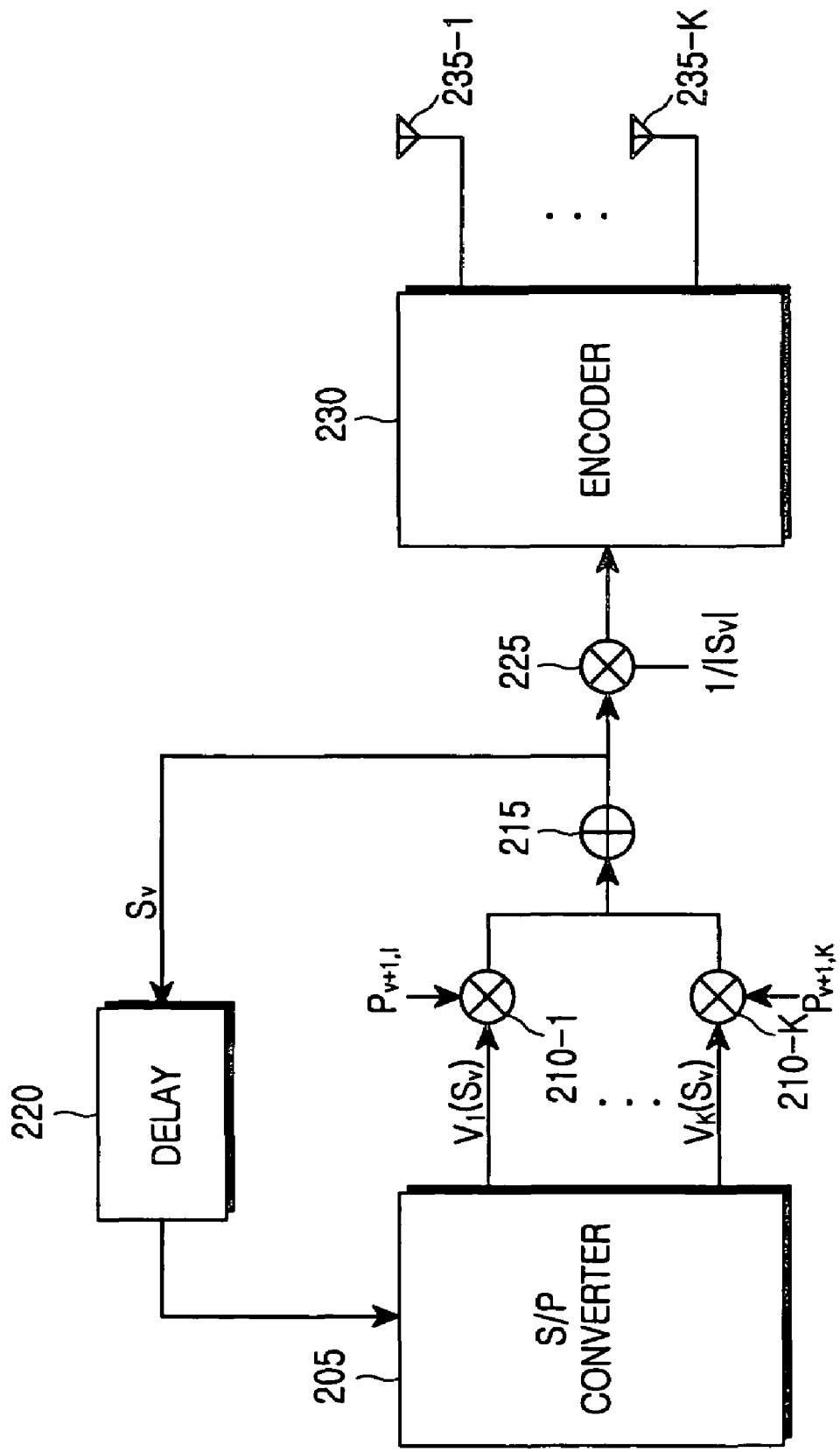
FIG. 5 is a block diagram illustrating a transmitter using a differential space-time block code according to an embodiment of the present invention.

FIG. 5 is a block diagram illustrating a transmitter using a differential space-time block code according to an embodiment of the present invention. As illustrated in FIG. 5, the transmitter includes a serial-to-parallel (S/P) converter 205, multipliers 210-1, . . . , 210-K, an adder 215, a delay 220, a normalizer 225, an encoder 230, and K transmission antennas 235-1, 235-2, . . . , 235-K.

Referring to FIG. 5, the S/P converter 205 parallel-converts a previously transmitted symbol block $S_v$ delayed by the delay 220, and outputs previous symbols $S_{v,1}, \ldots, S_{v,k}$. The multipliers 210-1 to 210-K multiply the K previous symbols by information symbols $P_{v+1,1}, \ldots, P_{v+1,K}$ to be actually transmitted, respectively, and the adder 215 adds output symbols of the multipliers 210-1 to 210-K, and delivers the result to the delay 220 to multiply the added result by the next information symbols. Further, the adder 215 provides the result to the normalizer 225. Here, the adder 215 is used when the information symbols are grouped by a predetermined number of symbols to transmit PSK or QAM modulation data, i.e., the adder 215 is optional.

The normalizer 225 multiplies the added symbols by a normalization value determined as a reciprocal $1/|S_v|$ of a size of a previous symbol block, and the encoder 230 creates a predetermined number of combinations with an output of the normalizer 225 according to a predetermined transmission encoding matrix, and transmits the combinations via the transmission antennas 235-1, 235-2, ..., 235-K for the corresponding time periods.

An operation of the transmitter will be described with reference to an example where 4 transmission antennas and the encoding matrix of Equation (1) are used. Initially, the transmitter transmits a particular symbol block $S_1 = [s_{1,1} \sim s_{1,4}]$ having no information according to the encoding matrix. When information symbols $P_{v+1} = (P_{v+1,1} \ldots P_{v+1,4})$ to be transmitted at a time v+1 are received, a transmission symbol $S_{v+1}$ is determined by Equation (10) below.

$$S_{v+1} = \sum_{k=1}^{4} P_{v+1,k} \frac{V_k(S_v)}{|S_V|} \quad (10)$$

$$= \sum_{k=1}^{4} \frac{P_{v+1,k} V_k(S_v)}{\sqrt{|s_{v,1}|^2 + |s_{v,2}|^2 + |s_{v,3}|^2 + |s_{v,4}|^2}}$$

That is, information symbols are multiplied by a symbol block $V_k(S_v)$ transmitted at a previous time, and then transmitted after being normalized. Here, a symbol block $V_k(S_v)$ transmitted for a $k^{th}$ symbol duration in a $v^{th}$ block duration is determined by Equation (11).

$$V_1(S_v) = (s_{v,1}, s_{v,2}, s_{v,3}, s_{v,4})^T$$

$$V_2(S_v) = (s_{v,2}, -s_{v,1}, s_{v,4}, -s_{v,3})^T$$

$$V_3(S_v) = (s_{v,3}, -s_{v,4}, -s_{v,1}, s_{v,2})^T$$

$$V_4(S_v) = (s_{v,4}, s_{v,3}, -s_{v,2}, -s_{v,1})^T \quad (11)$$

Normalizing a transmission symbol block with a size $|S_v|$ of a previous symbol block in a transmitter prevents deterioration of detection performance in a receiver caused by power variation of transmission symbols.

Figure 6:
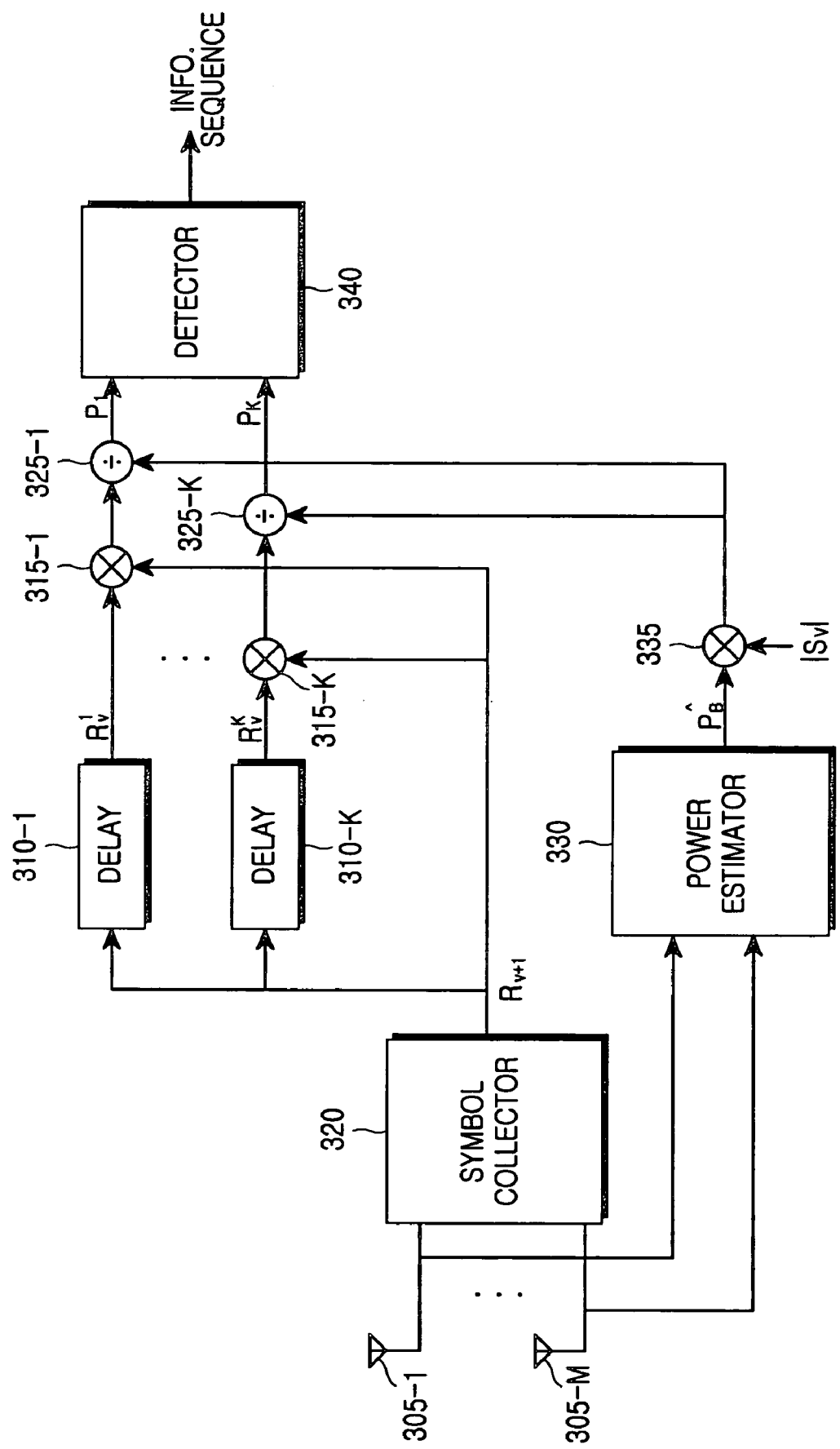
FIG. 6 is a block diagram illustrating a receiver for receiving a signal transmitted from the transmitter illustrated in FIG. 5, according to an embodiment of the present invention.

FIG. 6 is a block diagram illustrating a receiver for receiving a signal transmitted from the transmitter illustrated in FIG. 5, according to an embodiment of the present invention. As illustrated in FIG. 6, the receiver includes M reception antennas 305-1, 305-2, ..., 305-M, delays 310-1, ..., 310-K, multipliers 315-1, ..., 315-K, a symbol arranger 320, dividers 325-1, ..., 325-K, a power estimator 330, a normalizer 335, and a detector 340.

Referring to FIG. 6, the delays 310-1 to 310-K delay signals previously received for one block duration, and output the delayed signals to the multipliers 315-1 to 315-K. The symbol arranger 320 provides the multipliers 315-1 to 315-K with signals received at the reception antennas 305-1 to 305-M from the transmission antennas 235-1 to 235-K for one block duration. Here, one block duration is comprised of K symbol durations. The multipliers 315-1 to 315-K calculate substitution signals by multiplying the receive signals by the previously received signals.

The power estimator 330 calculates total power of channels with received signals, rather than calculating channel gains indicating channel characteristics from the K transmission antennas 235-1 to 235-K to the reception antennas 305-1 to 305-M. The normalizer 335 then multiplies the channel power by a normalization value determined as a size of previous reception power, and the dividers 325-1 to 325-K detect information symbols by dividing the substitution signals by the normalized channel power. The detector 340 detects an information sequence with the detected information signals according to a corresponding modulation scheme.

As described above, the receiver enables reliable decoding even when the information symbols are different in size, by removing an influence caused by channel characteristics from the received signals with the estimated channel power. Actually, channel power from the transmission antennas to the receiver can be expressed as shown in Equation (12).

$$h_1 h_1^* + h_2 h_2^* + \ldots h_K h_K^* \quad (12)$$

In Equation (12), $h_k$ indicates a channel gain from a $k^{th}$ transmission antenna to the receiver. Because $h_k$ is an independent complex Gaussian random variable, the channel power follows chi-square distribution, a freedom degree of which is 2K. Then, the channel estimator 330 can calculate an estimation value of the channel power through autocorrelation of the received signal in accordance with Equation (13).

$$\hat{p}_B = E\{r_{v+1,i}^* r_{v+1,i}\} = \sum_{i=1}^{4} |h_i|^2 + \sigma_w^2 \quad (13)$$

As described above, because v is a block duration index and i is a transmission antenna index, $r_{v+1,i}$ is an $i^{th}$ signal received for a $(v+1)^{th}$ block duration. Likewise, $h_i$ is a channel gain from an $i^{th}$ transmission antenna, and $\sigma_w^2$ is a noise variance.

In another case, by empirical autocorrelation, channel power is calculated using Equation (14).

$$\hat{p}_B = \frac{1}{L} \sum_{j=1}^{L} \sum_{i=1}^{4} r_{v+j-\frac{L}{2},i}^* r_{v+j-\frac{L}{2},i} \quad (14)$$

In Equation (14), L indicates the number of symbols used for estimation of channel power, i.e., indicates a length of symbol duration. Further, Equation (14), unlike Equation (13), more accurately estimates channel power using signals received for predetermined symbol durations rather than one block.

Information symbols $P_{v+1,1}$ to $P_{v+1,4}$ at a time v+1 are calculated by a reception signal at a time v and a reception signal at a time v+1. More specifically, reception signals are expressed as Equation (6) above, and reception signal combinations are created using the reception signals by the symbol arranger 320 in accordance with Equation (7). As described above, noise information is already known.

In order to detect information symbols, the multipliers 315-1 to 315-K calculate substitution signals by multiplying previously received signals provided from the delays 310-1 to 310-K by the currently received signals from the symbol arranger 320. The substitution signals are expressed in Equation (15).

$$R\{R_{v+1}^n R_v^{nH}\} = \sum_{i=1}^{4} |h_i|^2 \sqrt{\sum_{i=1}^{4} |s_{v,i}|^2} \, P_{v+1,n} + R\{W_n\} \quad (15)$$

In Equation (15), $R\{\cdot\}$ means real conversion, and $(\cdot)^H$ indicates Hermitian transpose. Equation (15) represents a substitution signal for calculating an $n^{th}$ information symbol $P_{v+1,n}$.

The square root term is a normalization value used to cope with channel variation, and is calculated using an autocorrelation of a previous reception signal and an estimation value of the channel power, or using the previous reception signal itself. An autocorrelation value of a previous reception signal is defined in Equation (16).

$$R\{R_v^n R_v^{nH}\} = \left(\sum_{i=1}^{4} |h_i|^2\right)\left(\sum_{i=1}^{4} |s_{v,i}|^2\right) + R\{W_n\} \quad (16)$$

That is, the normalization value is calculated by dividing Equation (16) by the channel power and then taking a square root. Then, the normalizer 335 outputs normalized channel power by multiplying the channel power by the normalization value, and the dividers 325-1 to 325-K output information symbols $P_{v+1,i}$ by dividing outputs of the multipliers 315-1 to 315-K, expressed as Equation (15), by the normalized channel power. The detector 340 restores an information sequence with the information symbols according to a corresponding modulation scheme.

The present invention easily detects information symbols even when the information symbols have different distances from the origin. For example, when 2 QAM modulation data symbols were transmitted through $P_1$ to $P_4$, the detector 340 is comprised of 2 QAM demodulators, and restores an information sequence with the 2 QAM modulation data symbols. When QAM is used in this way, an SNR loss can be minimized as compared with when PSK is used, and a receiver for decoding information symbols is simple in structure and various modulation schemes can be used.

Figure 7:
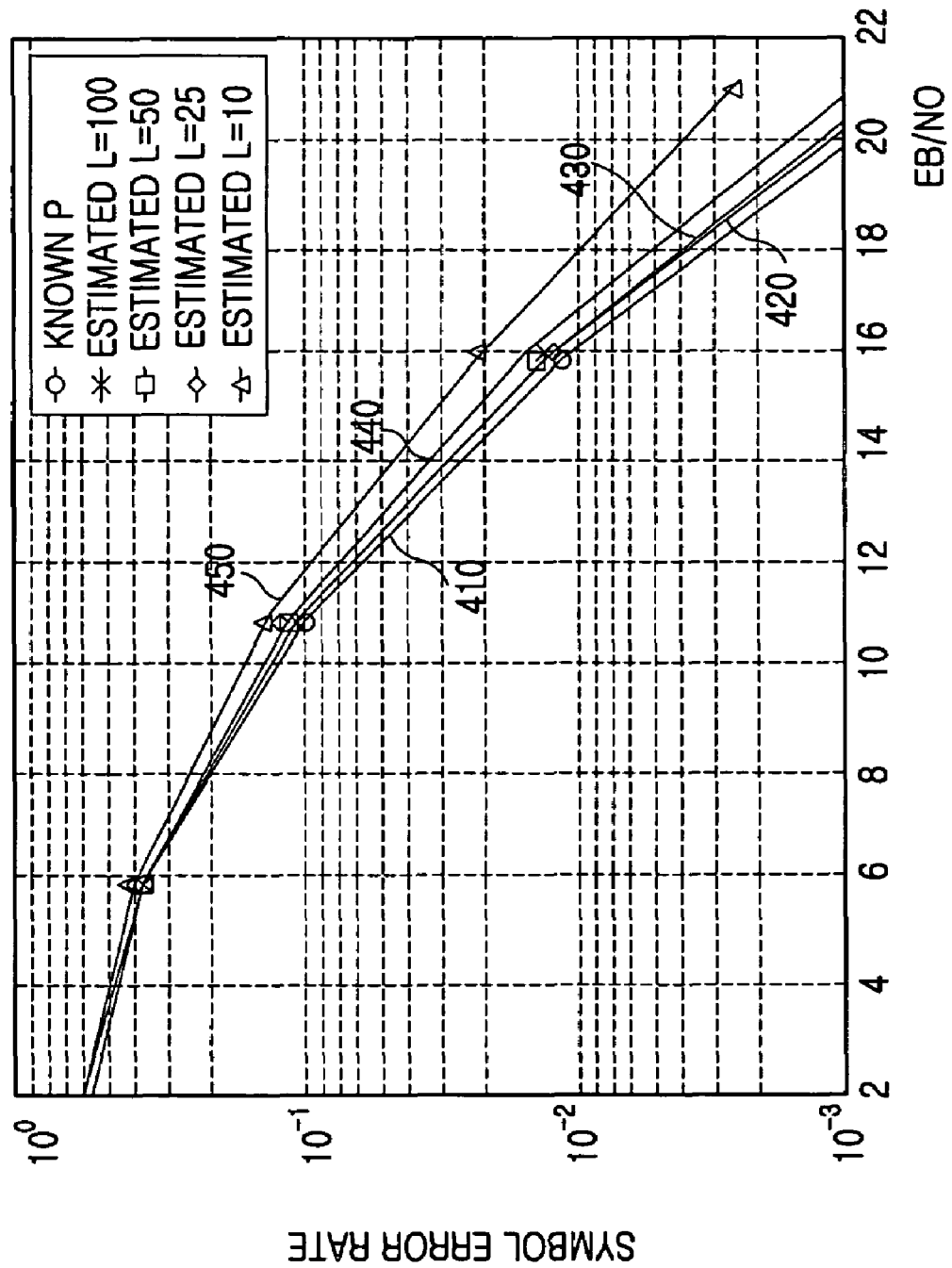
FIG. 7 illustrates symbol error rates (SERs) versus bit energy-to-noise (Eb/No) based on the number L of symbols for estimation of channel power according to an embodiment of the present invention.

FIG. 7 illustrates symbol error rates (SERs) versus bit energy-to-noise (Eb/No) based on the number L of symbols for estimation of channel power according to an embodiment of the present invention. Reference numeral 410 indicates performance for an ideal case where accurate channel power is known. Reference numerals 420 to 450 indicate performances determined using channel power estimated when L is 100, 50, 25 and 10, respectively. As illustrated in FIG. 7, it is noted that performance for the case where L is sufficiently long is not that different from the performance for the ideal case.

In order to analyze performance according to the present invention, a comparison will be made between a conventional case (hereinafter referred to as "first case") where of 4 information symbols, $P_1$ and $P_2$ are grouped to transmit one 16PSK modulation symbol, and $P_3$ and $P_4$ are grouped to transmit one 16PSK modulation data, and a proposed case (hereinafter referred to as "second case") where 16QAM modulation data is transmitted according to the present invention. Herein, in order to secure fairness of comparison, Equation (14) that does not use a training sequence was used when channel power was estimated according to the present invention.

Figure 8:
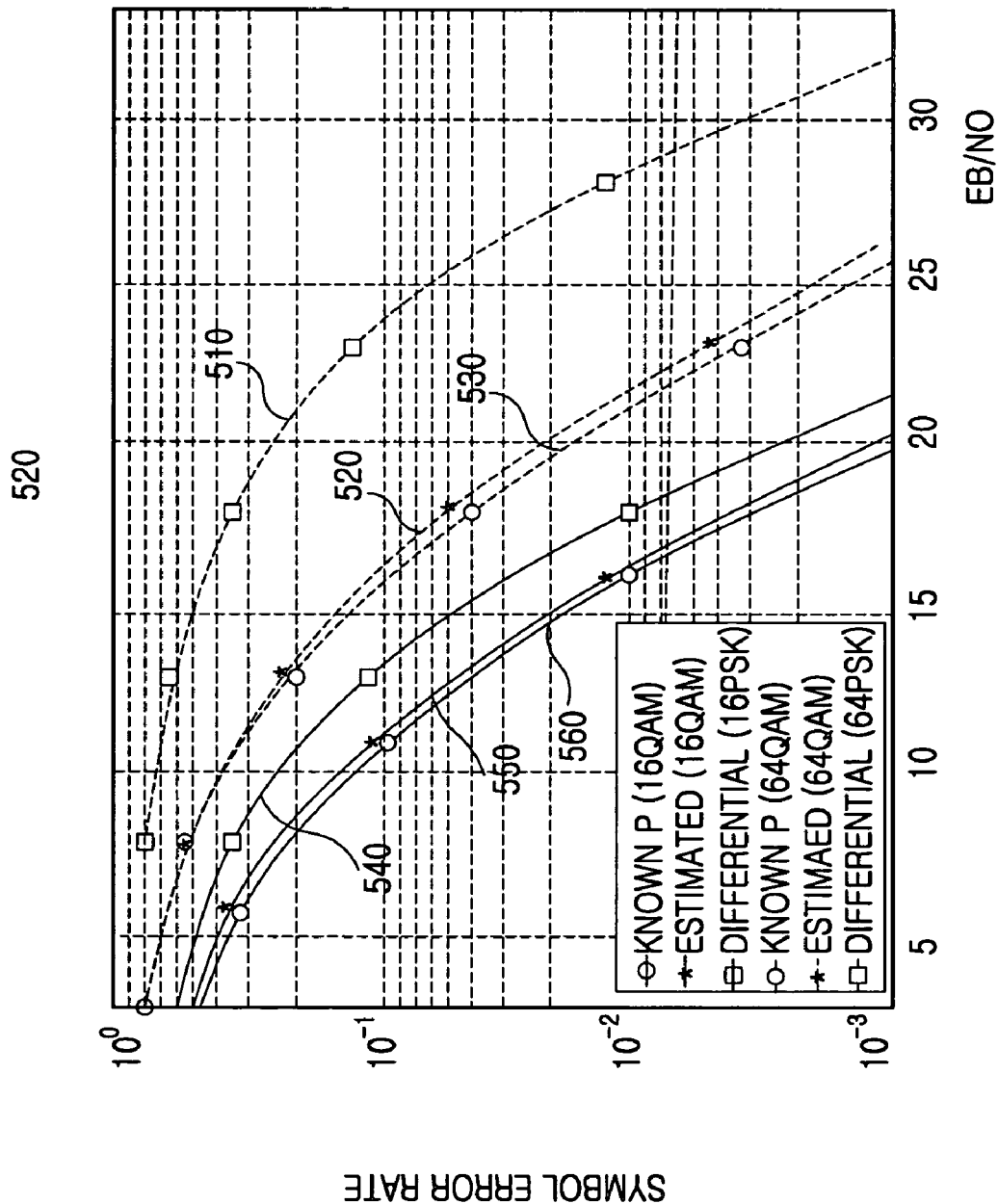
FIG. 8 illustrates a comparison between the conventional technology and the present invention in terms' of symbol error rates (SERs) versus bit energy-to-noise (Eb/No).

FIG. 8 illustrates a comparison between the first case and the second case in terms of symbol error rates (SERs) versus bit energy-to-noise (Eb/No). Reference numeral 560 indicates performance for the case where 16QAM modulation data is decoded according to the present invention when accurate channel power is not known. Reference numeral 550 indicates performance for the case where 16QAM modulation data is decoded using estimated channel power. Reference numeral 540 indicates performance for the case where 16PSK modulation data is decoded using the conventional differential STBC. Reference numeral 530 indicates performance for the case where 64QAM modulation data is decoded using accurate channel power. Reference numeral 520 indicates performance for the case where 64QAM modulation data is decoded using estimated channel power. Reference numeral 510 indicates performance for the case where 64PSK modulation data is decoded using the conventional differential STBC.

As illustrated in FIG. 8, the present invention can obtain a power gain of 6.2 dB at the same symbol error rate (SER), and this means that it is possible to reduce power of 6.2 dB in achieving the same symbol error rate. That is, performance reduction caused by an estimation of channel power is at a negligible level.

The present invention has a number of advantages when compared to the prior art. That is, the present invention can obtain SNR gain, because the invention enables transmission/reception being robust to fast fading, does not require a training sequence for channel estimation, and can transmit modulation symbols having different distances from the origin.

While the present invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for receiving information symbols encoded with a differential space-time block code (STBC) before being transmitted and decoding the received information symbols in a wireless communication system, the method comprising the steps of:
    collecting a signal received at a reception antenna from a plurality of transmission antennas for a block duration;
    calculating a substitution signal by multiplying the signal received from the plurality of antennas by a signal received for a previous block duration;
    estimating channel power for a channel from the plurality of transmission antennas to the reception antenna;
    normalizing estimated channel power with a normalization value that is determined as a size of previously received symbols; and
    calculating information symbols by dividing the substitution signal by normalized channel power.

2. The method of claim 1, wherein the information symbols are calculated by $$P_{v+1,n} = \frac{R\{R_{v+1}^n R_v^{nH}\} - R\{W_n\}}{\hat{p}_B |S_v|}$$

where $P_{v+1,n}$ is an $n^{th}$ information symbol at a current block duration v+1, $R\{\cdot\}$ indicates real conversion, $R_{v+1}^n$ and $R_v^n$ are reception signal combinations created to calculate an $n^{th}$ symbol with signals received for a current block duration v+1 and a previous block duration v, respectively, $(\cdot)^H$ indicates Hermitian transpose, $W_n$ is a noise at an $n^{th}$ symbol duration, $\hat{p}_B$ is the estimated channel power, and $|S_v|$ is the normalization value.

3. The method of claim 1, wherein the estimated channel power is calculated by $$\hat{p}_B = E\{r_{v+1,i}^* r_{v+1,i}\} - \sigma_w^2$$

where $r_{v+1,i}$ indicates a signal received for an $i^{th}$ symbol duration in a (v+1) block duration, and $\sigma_w^2$ indicates a noise variance.

4. The method of claim 1, wherein the estimated channel power is calculated by $$\hat{p}_B = \frac{1}{L}\sum_{j=1}^{L}\sum_{i=1}^{4} r^*_{v+j-\frac{L}{2},i} r_{v+j-\frac{L}{2},i}$$

where $r_{v+1,i}$ indicates a signal received for an $i^{th}$ symbol duration in a $(v+1)^{th}$ block duration, $\sigma_w^2$ indicates a noise variance, and L is a length of symbol durations used for the estimation of channel power.

5. The method of claim 1, wherein the normalization value is calculated by $$|S_v| = \sqrt{|S_{v,1}|^2 + |S_{v,2}|^2 + \ldots |S_{v,Nt}|^2}$$

$$|S_v| = \sqrt{|S_{v,1}|^2 + |S_{v,2}|^2 + |S_{v,3}|^2 + |S_{v,4}|^2}$$

where $|S_v|$ is a normalization value determined as a size of symbols received for a previous duration v+1, and $S_{v,Nt}$ is a symbol received for a previous block duration from a Nt-th transmit antenna.

6. The method of claim 1, wherein the normalization value is calculated by dividing an autocorrelation value of a previously received signal by the estimated channel power and then taking a square root.

7. The method of claim 6, wherein the normalization value is calculated by $$|S_v| = \sqrt{\frac{R\{R_v^n R_v^{nH}\} - R\{W_n\}}{\hat{p}_B}}$$

where $|S_v|$ is the normalization value, $S_v$ is a symbol block received at a previous duration v, $R\{\cdot\}$ indicates real conversion, $R_v^n$ is reception signal combinations created to calculate an $n^{th}$ information symbol with a signal received at a previous duration v, $(\cdot)^H$ indicates Hermitian transpose, $W_n$ is a noise at an $n^{th}$ symbol duration, and $\hat{p}_B$ is the estimated channel power.

8. The method of claim 1, wherein the information symbols are real numbers and are grouped by a predetermined number of symbols to carry one of PSK (Phase Shift Keying) and QAM (Quadrature Amplitude Modulation) data.

9. A receiver for receiving information symbols encoded with a differential space-time block code (STBC) before being transmitted and decoding the received information symbols in a wireless communication system, the receiver comprising:

a delay group for delaying a signal received for a previous block duration;

a symbol collector for collecting a signal received from a plurality of transmission antennas for a block duration;

a multiplier group for outputting a substitution signal by multiplying the signal received from the plurality of antennas by the signal received for a previous block duration;

a power estimator for estimating channel power for a channel from the plurality of transmission antennas to the receiver, with the signal received from the plurality of antennas;

a normalizer for outputting normalized channel power by multiplying estimated channel power by a normalization value that is determined as a size of previously received symbols;

a divider for calculating information symbols by dividing the substitution signal by the normalized channel power; and a detector for restoring an information sequence with the information symbols.

10. The receiver of claim 9, wherein the information symbols are calculated by $$P_{v+1,n} = \frac{R\{R_{v+1}^n R_v^{nH}\} - R\{W_n\}}{\hat{p}_B |S_v|}$$

where $P_{v+1,n}$ is an $n^{th}$ information symbol at a current block duration v+1, $R\{\cdot\}$ indicates real conversion, $R_{v+1}^n$ and $R_v^n$ are reception signal combinations created to calculate an $n^{th}$ symbol with signals received for a current block duration v+1 and a previous block duration v, respectively, $(\cdot)^H$ indicates Hermitian transpose, $W_n$ is a noise at an $n^{th}$ symbol duration, $\hat{p}_B$ is the estimated channel power, and $|S_v|$ is the normalization value.

11. The receiver of claim 9, wherein the estimated channel power is calculated by $$\hat{p}_B = E\{r_{v+1,i}^* r_{v+1,i}\} - \sigma_w^2$$

where $r_{v+1,i}$ indicates a signal received for an $i^{th}$ symbol duration in a $(v+1)^{th}$ block duration, and $\sigma_w^2$ indicates a noise variance.

12. The receiver of claim 9, wherein the estimated channel power is calculated by $$\hat{p}_B = \frac{1}{L}\sum_{j=1}^{L}\sum_{i=1}^{4} r^*_{v+j-\frac{L}{2},i} r_{v+j-\frac{L}{2},i}$$

where $r_{v+1,i}$ indicates a signal received for an $i^{th}$ symbol duration in a $(v+1)^{th}$ block duration, $\sigma_w^2$ indicates a noise variance, and L is a length of symbol durations used for the estimation of channel power.

13. The receiver of claim 9, wherein the normalization value is calculated by $$|S_v| = \sqrt{|S_{v,1}|^2 + |S_{v,2}|^2 + \ldots |S_{v,Nt}|^2}$$

where $|S_v|$ is a normalization value determined as a size of symbols received for a previous duration v+1, and $S_v$ is a symbol received for a previous block duration from a Nt-th transmit antenna.

14. The receiver of claim 9, wherein the normalization value is calculated by dividing an autocorrelation value of a previously received signal by the estimated channel power and then taking a square root.

15. The receiver of claim 14, wherein the normalization value is calculated by $$|s_v| = \sqrt{\frac{R\{R_v^n R_v^{nH}\} - R\{W_n\}}{\hat{p}_B}}$$

where $|S_v|$ is the normalization value, $S_v$ is a symbol block received at a previous duration v, $R\{\cdot\}$ indicates real conversion, $R_v^n$ is reception signal combinations created to calculate an $n^{th}$ information symbol with a signal received at a previous duration v, $(\cdot)^H$ indicates Hermitian transpose, $W_n$ is a noise at an $n^{th}$ symbol duration, and $\hat{p}_B$ is the estimated channel power.

16. The receiver of claim 10, wherein the information symbols are real numbers and are grouped by a predetermined number of symbols to carry one of PSK (Phase Shift Keying) and QAM (Quadrature Amplitude Modulation) data.

* * * * *